(12) United States Patent
Chou et al.

(10) Patent No.: US 10,271,187 B2
(45) Date of Patent: Apr. 23, 2019

(54) FRAMEWORK OF CLOUD SERVICE FOR BIOLOGICAL GROWTH

(71) Applicant: National Taiwan University, Taipei (TW)

(72) Inventors: Jui-Jen Chou, Taipei (TW); Min-Hsiung Hung, Taipei (TW); Shih-Sung Lin, Taipei (TW); Ming-Yen Lin, Taipei (TW)

(73) Assignee: National Taiwan University, Taipei (TW)

( * ) Notice: Subject to any disclaimer, the term of this patent is extended or adjusted under 35 U.S.C. 154(b) by 647 days.

(21) Appl. No.: 14/689,658

(22) Filed: Apr. 17, 2015

(65) Prior Publication Data

US 2015/0312701 A1    Oct. 29, 2015

(30) Foreign Application Priority Data

Apr. 24, 2014 (TW) .............................. 103114798 A

(51) Int. Cl.
*G01N 33/48* (2006.01)
*H04W 4/38* (2018.01)
*H04L 29/08* (2006.01)

(52) U.S. Cl.
CPC ........... *H04W 4/38* (2018.02); *H04L 67/1002* (2013.01); *H04L 67/12* (2013.01)

(58) Field of Classification Search
None
See application file for complete search history.

*Primary Examiner* — Larry D Riggs, II
(74) *Attorney, Agent, or Firm* — Mintz Levin Cohn Ferris Glovsky and Popeo, P.C.; Peter F. Corless; Steven M. Jensen

(57) ABSTRACT

A framework of cloud service for biological growth is disclosed. The framework of cloud service for biological growth includes a client end, a service provider, an expert end, and an equipment end. The client end has a biological cultivate area, a first processing unit, a first control module, and a first transceiver module. The service provider has a first database, a second processing unit, a data integration module, a web server, a data integration module, and a second transceiver module. The expert end has a second database, a third processing unit, a second monitoring module, a biological growth simulation module, and a third transceiver module. The equipment end has a third database, a fourth processing unit, and a fourth transceiver module. The present invention acquires and simulates the first environmental parameter of the client end and obtains the preferable third environmental parameter, or matches the data of the expert end and the equipment end and provides customized installation information or operation information.

6 Claims, 8 Drawing Sheets

FRAMEWORK OF CLOUD SERVICE FOR BIOLOGICAL GROWTH

CROSS-REFERENCES TO RELATED APPLICATIONS

This application claims under 35 U.S.C. § 119(a) the benefit of Taiwanese Application No. 103114798, filed Apr. 24, 2014, the entire contents of which are incorporated herein by reference.

BACKGROUND OF THE INVENTION

1. Field of the Invention

The present invention relates to biological species monitoring techniques, and, more particularly, to a framework of cloud service for providing preferable environment parameters for the biological growth.

2. Description of Related Art

In references and publications of biological growth, there are different opinions regarding providing preferable environment parameters, causing a lot of confusion for the users. Both observability and controllability from the users in view of the biological growth are insufficient.

Besides users and researchers both cannot identify the growth state in real time, i.e., how the environment parameters affect biological growth, as a result the environment parameters cannot be adjusted immediately. Moreover, the cycle using a traditional method is long.

On the other hand, in large scaled biological growth, it is difficult to obtain the preferable environment parameters due to the size and cost required to test different parameters. The loss is great once the test failed.

In addition, the environment sensor used to monitor the overall wind, light, water, nutrients and oxygen, not the environment directly surrounding the biological species, therefore it is easy that the environment parameters are uneven, causing inconsistent results between the biological growth parameters and the actual biological growth state.

Even though researchers are able to recommend an environment parameter, the result is still unsatisfactory, due to the differences on growth states, cultivating stages, and species.

Thus, there is an urgent need in solving the foregoing drawbacks of prior art.

SUMMARY OF THE INVENTION

In view of the drawbacks, one objective of present invention is to provide a framework of cloud service for biological growth in which a preferable environmental parameter is obtained according to a request from a client end, allowing the client end to cultivate a biological species with the preferable environmental parameter.

Another objective of the of the present invention is to provide a framework of cloud service for biological growth that monitors the client end and obtains growth states of the biological species and a first environmental parameter, so as to provide a warning message if necessary at an appropriate time.

Yet another objective is to provide a framework of cloud service for biological growth that provides an immediate downloadable biological cultivating area of the client end in response to a third environmental parameter, so as to solve the problem of poor biological growth or through organizing the information from the expert end and equipment information from the equipment end, and to provide customized installation and information.

The framework of cloud service for biological growth according to the present invention comprises: a client end comprising a biological cultivating area where biological species are cultivated, a first monitoring module that monitors environments of the biological cultivating area and growth states of the biological species and generates a first environmental parameter, a first processing unit that receives the first environmental parameter, and a first transceiver module that transmits the first environmental parameter; a service provider comprising a service integration interface, a second processing unit, a web server, a data integration module, a first database, and a second transceiver module, wherein the client end downloads an operation page from the web server to build a request of the client end, the request of the client end and the first environmental parameter are uploaded to the service provider, the service integration interface is integrated with a plurality of services, the second processor unit initiates a service corresponding to the service integration interface in response to the request of the client end, the first environmental parameter is stored in the first database, the first database is further stored with a second environmental parameter, and the second transceiver module sends the operation page and receives the request of the client end and the first environmental parameter; an expert end that integrates expert data corresponding to the cultivated biological species at the client end, the expert end comprising a third processing unit and a third transceiver module, wherein the expert end downloads the operation page from the service provider, the third processing unit builds a request of the expert data on the operation page, and the third transceiver receives the operation page and uploads the request of the expert end and the expert data; and an equipment end that provides hardware equipment data required for cultivating the biological species, wherein the hardware equipment data are sent and stored in the first database of the service provider, and the data integration module integrates and sends the expert data and the hardware equipment data to the client end.

Accordingly, the framework of cloud service for biological growth according to the present invention acquires in a real-time manner the first environment parameter of the biological cultivating area from the client end, and obtains a preferable third environmental parameter based on the current parameter. The biological cultivating area is downloaded when a request is issued from the client end, allowing the client end to cultivate the biological species using the preferable environmental parameter. The present invention monitors growth states of the biological species of the client end in a real time manner, so as to promptly notify the operational personnel of the client end when any abnormality is found during cultivation of the biology species of the client end. Moreover, the present invention integrates the comments given by the experts and the hardware provider, so as to provide customized information to the client end.

DETAILED DESCRIPTION OF THE PREFERRED EMBODIMENTS

Various specific details are provided herein to provide a more thorough understanding of the invention.

Figure 1:
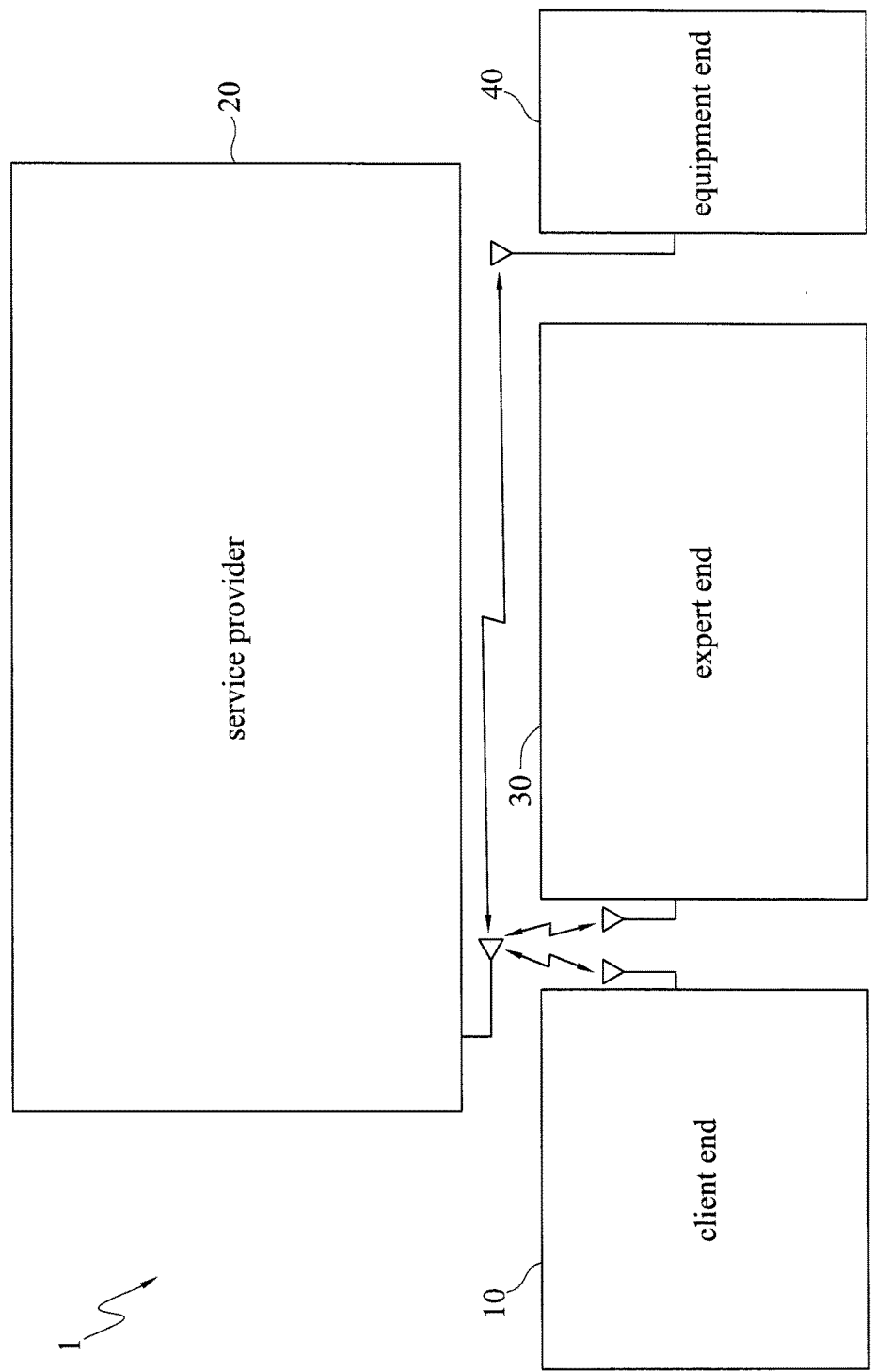
FIG. 1 is a functional block diagram of a framework of cloud service for biological growth according to the present invention.

FIG. 1 is a functional block diagram of a framework of cloud service for biological growth according to the present invention. The framework of cloud service for biological growth comprises: a client end 10, a service provider 20, an expert end 30 and an equipment end 40. The service provider 20 is used to provide and select an environmental parameter as required by the client end 10, as well as integrate opinions from different experts and the equipment end 40 required for cultivating the biological species. The expert end 30 is an expert who is able to integrate knowledge of cultivating the biological species for providing the integrated knowledge for the client end 10. The equipment end 40 is used to provide the hardware equipment information required for cultivating the biological species.

Figure 2:
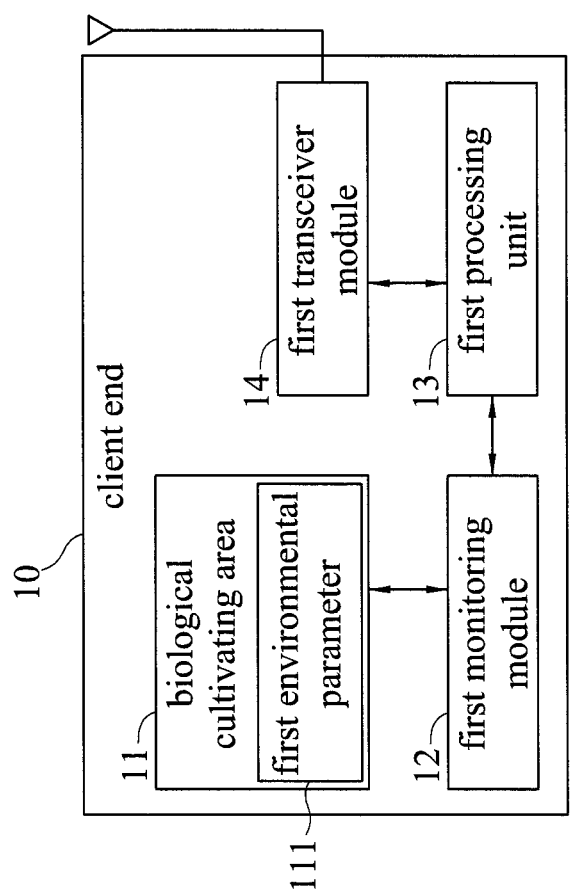
FIG. 2 is a functional block diagram of a client end according to the present invention.

Referring to FIG. 2, the client end 10 comprises a biological cultivating area 11, a first monitoring module 12, a first processing unit 13, and a first transceiver module 14. The biological cultivating area 11 is used for a large amount of biological species to be cultivated therein. The first monitoring module 12 is used to monitor environments of the biological cultivating area 11 and growth states of the biological species, to produce a first environmental parameter 111, which is processed in the first processing unit 13, and then sent out through the first transceiver module 14.

Figure 3A:
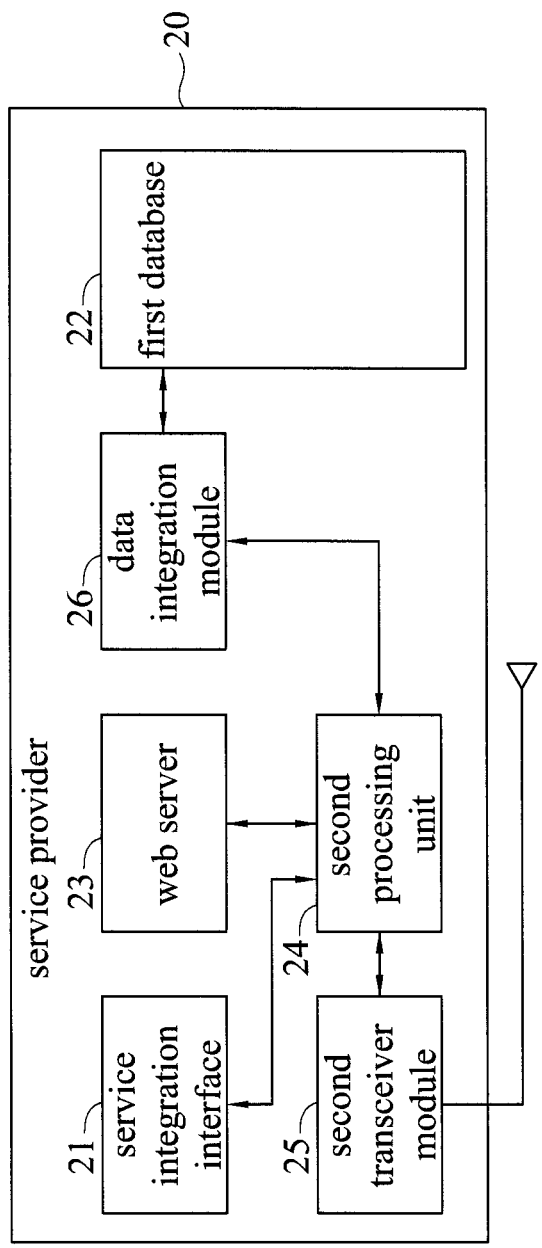
FIG. 3A is a functional block diagram showing a service provider according to the present invention.
Figure 3B:
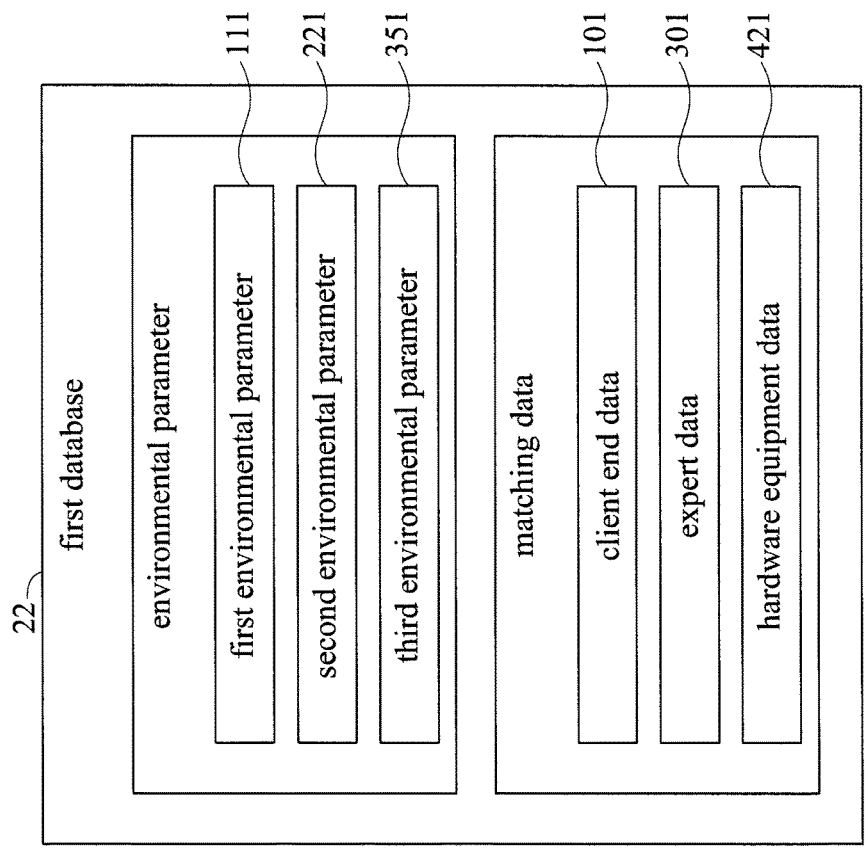
FIG. 3B is a functional block diagram of a first database according to the present invention.

Referring to both FIGS. 3A and 3B, the service provider 20 is a cloud service, and comprises a service integration interface 21, a first database 22, a web server 23, a second processing unit 24, a second transceiver module 25, and a data integration module 26. The service integration interface 21 integrates a plurality of services. The web server 23 is used to provide the client end 10, the expert end 30, or the equipment end 40 for downloading the operation page. The second processing unit 24 is used to initiate the service integration interface 21 in response to request of the client end 10, the expert end 30 or the equipment end 40. The first database 22 is used to store the second environmental parameter 221 in advance, corresponding to each species, and then through the data integration module 26 stored with the first environmental parameter 111, a preferable third environmental parameter 351 is obtained. Besides, the first database 22 is used to store the request from the client end 10, the expert data 301 from the expert end 30, and the hardware equipment data 421 from the equipment end 40.

Figure 3C:
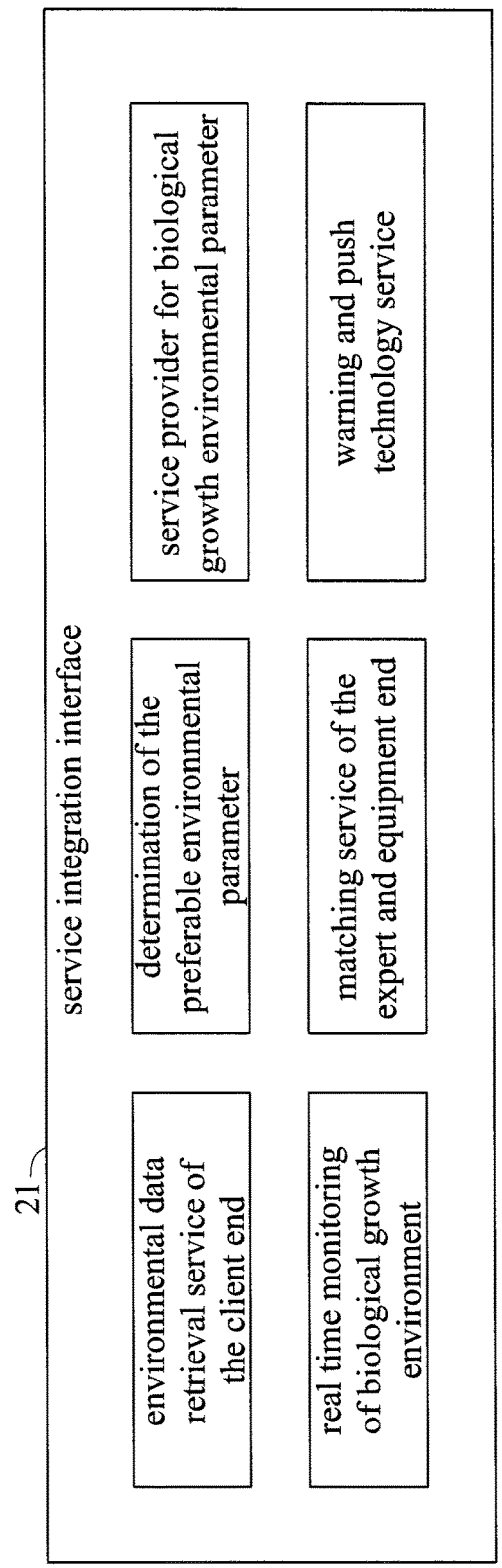
FIG. 3C is a functional block diagram of a service integration interface according to the present invention.

Referring to FIG. 3C, a functional block diagram of the service integration interface 21 according to the present invention is shown. The service integration interface 21 integrates a plurality of services, including: environmental data retrieval service of the client end, determination of the preferable environmental parameter, service provider for biological growth environmental parameter, real time monitoring of biological growth environment, warning and push technology service, and matching service of the expert and equipment end, which are initiated in response to the requests of the client end 10, the expert end 30, and the equipment end 40.

Figure 4A:
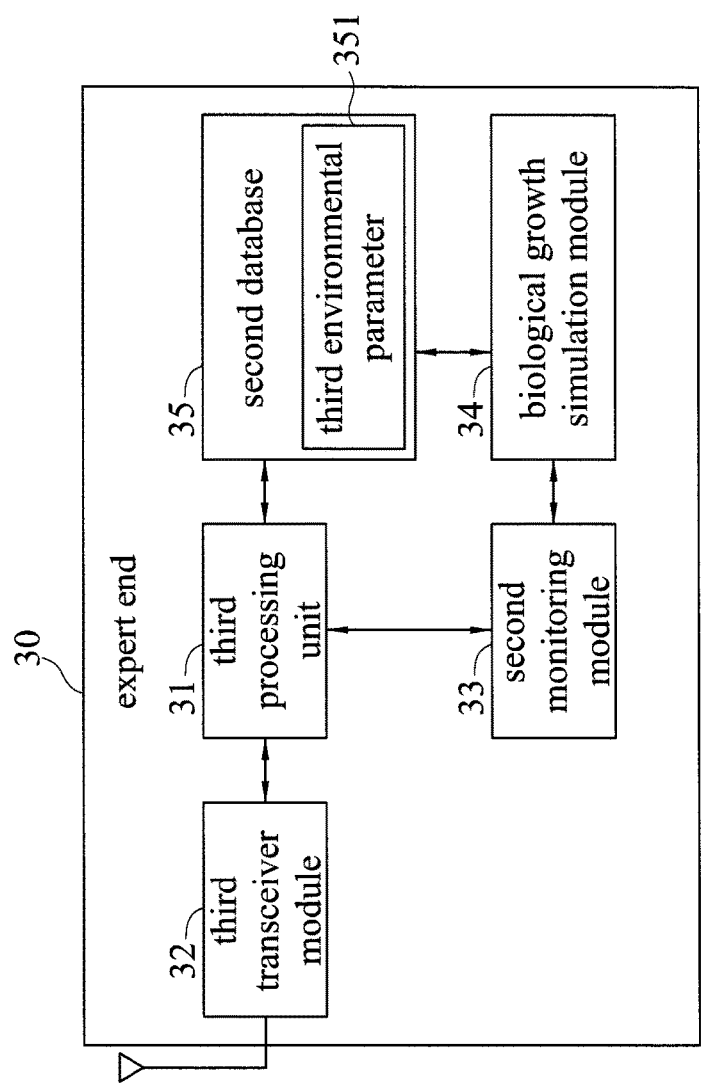
FIG. 4A is a functional block diagram of an expert end according to the present invention.

Referring to FIG. 4A, the expert data 301 is used to provide expert data 301 corresponding to the biological species cultivated in the biological cultivating area 11. The data integration module 26 of the service provider 20 integrates and stores the expert data 301 in the first database 22 of the service provider 20. The expert end 30 comprises a third processing unit 31, a third transceiver module 32, a second monitoring module 33, a biological growth simulation module 34, and a second database 35. The third transceiver module 32 is used to receive the operation page provided by the web server 23. The third processing unit 31 is used to login the operation page to build the requests of the expert end 30, which is then sent to the service provider 20 through the third transceiver module 32.

Referring to FIGS. 1, 2, 3A and 3B, the framework of cloud service for biological growth 1 disclosed in an embodiment according to the present invention features in providing environmental parameters in response to the requests of the client end 10. When a request on environmental parameter is made on the client end before the biological species is cultivated, the client end 10 issues a request to the service provider 20. After the service provider 20 receives the request from the client end 10, the second processing unit 24 retrieves the second environmental parameter 221 which is stored in advance in the first database 22. The second transceiver module 25 sends the second environmental parameter to the client end 10. After receiving the second environmental parameter 221, the client end 10 can cultivate the biological species by reference to the second environmental parameter 221.

Referring to FIGS. 1 to 4A, the framework of cloud service for biological growth disclosed in another embodiment according to the present invention features in retrieval of the first environmental parameter 111 of the biological cultivating area 11 of the client end 10, which is stored in the service provider 20. A request for retrieval of an environmental parameter from the expert end 30 is sent to the service provider 20. The second processing unit 24 of the service provider 20 is able to obtain the operation page from the web server 23, and the second transceiver module 25 sends the operation page to the expert end 30.

The expert end 30 logins the downloaded operation page and builds a retrieval request. The third transceiver module 32 sends the retrieval request to the service provider 20. After receiving the retrieval request, the second processing unit 24 of the service provider 20 initiates the service of retrieval of client environmental data of the service integration interface 21, and the service provider 20 downloads the retrieval request to the client end 10.

The first transceiver module 14 of the client end 10 receives the retrieval request which is sent to the first processing unit 13, and is sent to the first monitoring module 12 by the first processing unit 13. The first monitoring module retrieves the first environmental parameter 111, such as wind, light, water, nutrition, and oxygen of the biological cultivating area 11 according to the retrieval request. The retrieved first environmental parameter 111 is then sent to the first monitoring module 12. Subsequently, the first processing unit 13 sends the first environmental parameter 111 to the first transceiver module 14, and the first transceiver module 14 sends the retrieved first environmental parameter 111 to the service provider 20. After the second transceiver module 25 of the service provider 20 receives the first environmental parameter 111, the second processing unit 24 stores the first environmental parameter 111 in the first database 22 through the data integration module 26.

Referring to FIGS. 1 to 4A, in another embodiment of the present invention, the expert end 30 of the framework of cloud service for biological growth further comprises a second monitoring module 33, a biological growth simulation module 34 and a second database 35. The biological growth simulation module 34 is used to simulate the environment of the biological cultivating area 11. The second database 35 is used to store the preferable third environmental parameter 351 after simulation. The second monitoring module 33 is used to monitor the biological growth simulation module 34 during the simulation.

In the foregoing embodiments according to the present invention, the first environmental parameter 111 of the client end 10 has been retrieved and stored. Therefore, in the present embodiment the present invention features in the identification process of the retrieved first environment parameter 111. A first method for identifying the first environmental parameter 111 comprises downloading the operation page from the expert end 30 through the service provider 20, completing a registration of request of identification of environmental parameters, and sending the environmental parameter request to the service provider 20.

After the service provider 20 receives the identification of environmental parameter request, the second processing unit 24 correspondingly initiates the identification of preferable environmental parameter service of the service integration interface. Subsequently, the second processing unit 24 retrieves the first environmental parameter 111 of the client end 10 from the first database 22, and the first environmental parameter 111 is then sent to the expert end 30, for the second transceiver module 25 to perform the parameter identification process.

Figure 4B:
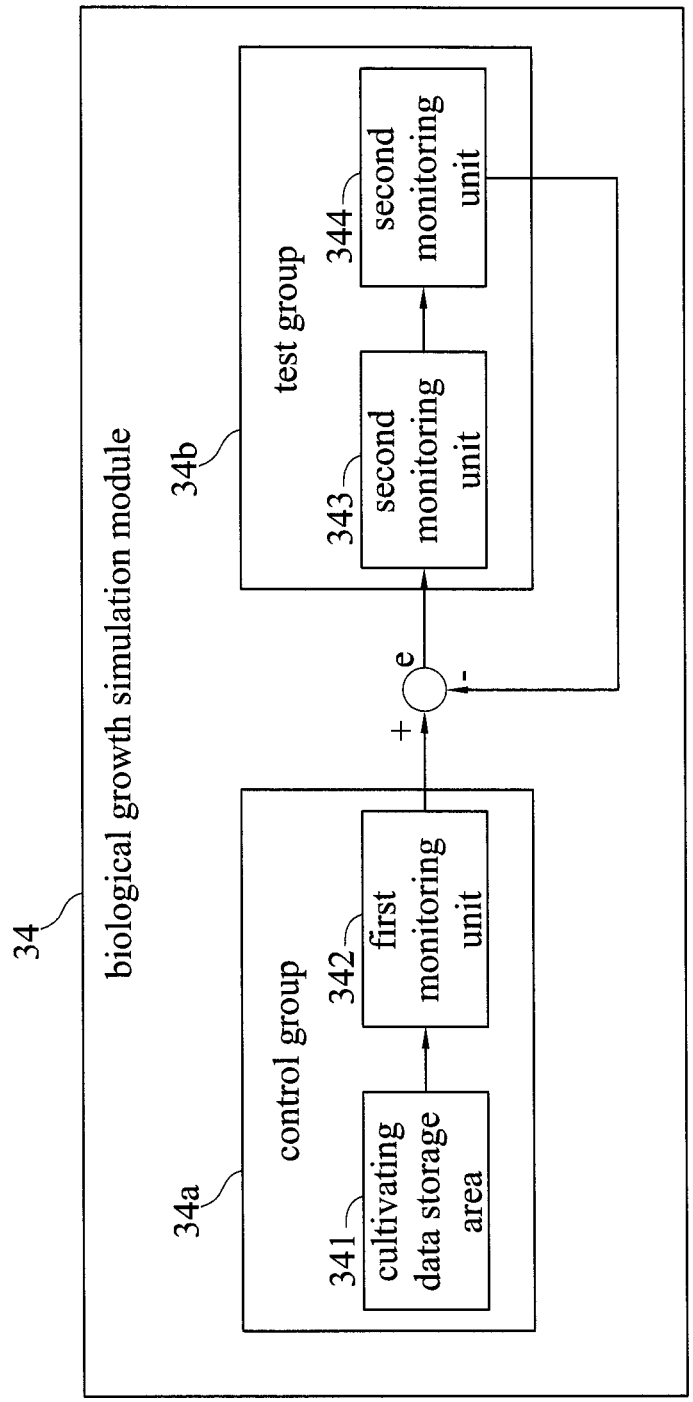
FIG. 4B is a functional block diagram of a cloud service for biological growth according to the present invention.
Figure 5:
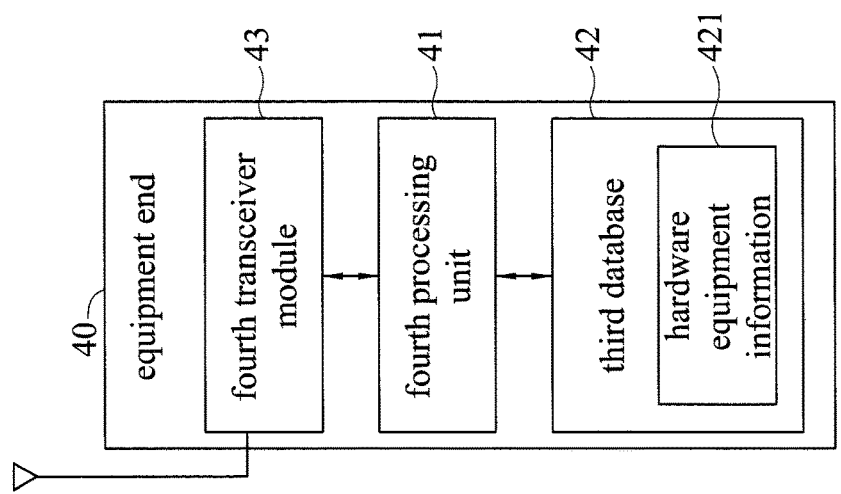
FIG. 5 is a functional block diagram of an equipment end according to the present invention.

Referring to FIG. 4B, the biological growth simulation module 34 comprises a control group 34a and a test group 34b. The control group 34a comprises a cultivating data storage area 341 having related cultivating data, and a first monitoring unit 342 for sending the related cultivating data. The test group 34b comprises a second monitoring unit 343 and a biological test area 344. The biological test area 344 involves cultivating a small amount of biological species, which is the same as that cultivated in the biological cultivating area 11. The growth environment of the biological test area 344 imitates that of the biological cultivating area 11 according to the related cultivating data from the client end 10, including the same or similar light, temperature, moisture, carbon dioxide, or nutrient concentration. The light comprises light quality (frequency of the light) and light intensity (illumination strength) or light cycle.

The biological test area 344 simulates the growth environment and condition in the biological cultivating area 11. The environmental parameter of the biological test area 344 is compared with the environmental parameter sent by the first monitoring unit 342 to produce an error (e). When the error (e) exceeds a predetermined acceptable range, the second monitoring unit 343 adjusts the environmental parameter in the biological test area 344, so as to control the error in the predetermined acceptable range.

When environmental parameter is tested in the test area 34b of the biological test area 344, the second monitoring unit 343 adjusts one of the environmental parameters of the biological test area 344, while keeping the rest of the environmental parameters unchanged, to know the effect of the parameter, so as to obtain a preferable third environmental parameter 351. The third environmental parameter 351 is then stored in the second database 35.

Refer to FIGS. 1 to 4A. When the third environmental parameter 351 is downloaded, the client end 10 downloads the operation page from the server provider 30 and register to complete the request of client end 10, and the request and the client data 101 are then sent to the service provider 20.

The second transceiver module 25 of the service provider 20 receives the request from the client end 10, and the second processing unit 24 initiates the service integration interface 21 to provide the biological environment parameters in response to the request from the client end 10. The request of the client end 10 is then sent to the expert end 30.

The expert end 30 receives the request of the client end 10 through the third transceiver module 32 and sends the request of the client end 10 to the third processing unit 31, and then a preferable third environmental parameter 351 is obtained from the second database 35 in the third processing unit 31 according to the request. The third transceiver module 32 sends the preferable third environmental parameter 351 to the service provider 20, and the service provider 20 sends the preferable third environmental parameter 351 to the client end 10. The data integration module 26 stores the preferable third environmental parameter 351 in the first database 22.

The client end 10 receives the preferable third environmental parameter 351 from the first transceiver module 14, and sends the preferable third environmental parameter 351 to the first processing unit 13. The first processing unit 13 downloads the preferable third environmental parameter 351 to the first monitoring module 12. The first monitoring module 12 controls the environmental parameter of the biological cultivating area 11 according to the third preferable environmental parameter.

In the foregoing embodiment, the biological growth simulation module 34 of FIG. 4A has simulated the preferable third environmental parameter 351, and stores the preferable third environmental parameter 351 in the second database 35. Since the environmental parameters are likely to be changed as any external factors change during the cultivating process of the client end 10, the client 10 can request to download the preferable third environmental parameter 351.

Refer again to FIGS. 1 to 3C. In addition to retrieving the first environmental parameter 111 of the client end 10 and simulating a preferable third environmental parameter 531, the framework of cloud service for biological growth according to the present invention can further monitors the first environmental parameter 111 from the client end 10 in real time.

When needing the present invention to monitors the biological cultivating area 22 in real time, the client end 10 has to download and register in the operation page from the service provider 20 to form a real time monitoring request, and sends the request to the service provider 20.

After the service provider 20 receives the request from the client end 10, the second processing unit 24 of the service provider 20 initiates the corresponding service, i.e., the environment monitoring service shown in FIG. 3C, at the service integration interface 21 in response to the request made by the client end 10. Meanwhile, the second processing unit 24 of the service provider site 20 and the first processing unit 13 of the client end 10 obtain a common protocol, which allows the first processing unit 13 to download the biological environment monitoring service to the first monitoring module 12, and the first monitoring module 12 monitors the first environmental parameter 111 of the biological cultivating area 11 and the biological growth state in real time and sends the monitored result back to the service provider 20.

In the monitoring process, if the service provider 20 finds any abnormality is found with regard to the first environmental parameter 111 or the biological growth state of the biological cultivating area 11, the second processing unit 24 of the service provider 20 stores the abnormality message in the first database 22 of the service provider 20, and, at the same time, initiates warning and push technology service of the service integration interface 21 to generate a text message type of warning message to a mobile phone of the operation person of the client end 10 through the second transceiver module 25. Therefore, the operation person can monitor the condition of the client end 10.

Refer to FIGS. 1 to 5. In another embodiment, the framework of cloud service for biological growth 1 according to the present invention further integrates hardware equipment information 421 of the equipment end 40. The service provider 20 has a fourth processing unit 41, a third database 42, and a fourth transceiver module 43. The third database 42 is used to store the hardware equipment information 421, and the fourth processing unit 41 retrieves the hardware equipment information 421 from the third database 42. The fourth transceiver module 43 sends the hardware equipment information 421 to the service provider 20 and stores the hardware equipment information 421 in the first database 22. Therefore, when a request is made from the client end 10, the data integration module 26 of the service provider 20 integrates and sends the expert information 301 and hardware equipment information 421 to the client end 10.

The framework of the cloud service for biological growth 1 according to the present invention provides a matching service according to the request of the client end 10. When a matching request from the client end 10 is made, the client end 10 has to download the operation page from the service provider 20 and make a registration, to form a matching requirement order, and the matching requirement order and the client information 101 are sent to the service provider 20.

The second processing unit 24 of the service provider 20 receives the matching requirement order from the client end 10, and the second processing unit 24 then stores the matching requirement order and the client information 101 in the first database 22 and initiates the corresponding expert and equipment matching service of the service integration interface 21. At the same time, the second processing unit 24 notifies the data integration module 26. After the data integration module 26 receives the notification from the second processing unit 24, the data integration module 26 integrates the expert data 301 and the hardware equipment data 421 obtained from the first database 22, and sends the integrated result to the client end 10 through the second transceiver module 25, allowing the client end 10 to build the system or operation method according to the matched result. It should be noted that the integrated result of the data integration module 26 is not only sent to the client end 10, but also sent to the appropriate expert end 30 and equipment end 40, allowing the expert end 30 and the equipment end 40 to update data according to the integrated result. In addition, apart from the integration of expert data 301 and the hardware equipment information 421, the data integration module 26 is also responsible to integrate all kinds of environmental parameters, allowing the environmental parameters to be stored in the first database of the service provider 20.

It should be noted, only one client end 10 is used in the drawings of the present invention for cultivating biological species, and a preferable third environmental parameter 351 simulated by the expert end 30 is downloaded to the client end 10 through the service provider 20. However, it should be known by any person skilled in the art that the number illustrated in the drawings to describe the client end 10 is changeable and is not limited to one. In fact, the client end 10 can be multiple, different biological species can be cultivated for each of the client end 10. The service provider 20 can provide different services in response to different client end 10.

Moreover, not only the client end can be of multiple numbers, the service provider 20, the expert end 30 and the equipment end 40 can all be of multiple numbers according to the present invention. If the number of client end 10 exceeds the capability a single service provider 20 can afford, the number of the service provider 20, the expert end 30 and the equipment end 40 can be increased accordingly.

In summary, the framework of cloud service for biological growth according to the present invention allows real time retrieval of the first environmental parameter 111 of the biological cultivating area 11, and according to the first environmental parameter 111 to obtain a preferable third environmental parameter 351 of the client end 10 through a simulation process, such that the biological cultivating area 11 of the client end 10 is downloaded, when a request is made from the client end, allowing the client end to cultivate the biological species using the preferable environmental parameters, as well as monitoring the biological growth state of the client end 10 in real time, so as to promptly notify the operational person of the client end 10 when any abnormality is found during cultivating of the biology species of the client end. Moreover, when a request is issued from the client end 10, the present invention allows integration of expert data 301 and the hardware equipment information 421 of the equipment end 40, so as to provide customized information to the client end.

The present invention has been described using exemplary preferred embodiments. However, it is to be understood that the scope of the present invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A device, comprising:
a first apparatus comprising hardware equipment, a first monitor that monitors growth states of biological species and generates a first environmental parameter, a first processor that receives the first environmental parameter, and a first transceiver that transmits the first environmental parameter;
a service provider comprising a service integration interface, a second processor, a web server, a data integration module, a first database, and a second transceiver, wherein the first apparatus downloads an operation page from the web server to build a request of the first apparatus, the request of the first apparatus and the first environmental parameter are uploaded to the service provider, the service integration interface is integrated with a plurality of services, the second processor initiates a service corresponding to the service integration interface in response to the request of the first apparatus, the first environmental parameter is stored in the first database, the first database is further stored with a second environmental parameter, and the second transceiver sends the operation page and receives the request of the first apparatus and the first environmental parameter;

a second apparatus that integrates expert data corresponding to the biological species, the second apparatus comprising a third processor and a third transceiver, wherein the second apparatus downloads the operation page from the service provider, the third processor builds a request of the expert data on the operation page, and the third transceiver receives the operation page and uploads the request of the second apparatus and the expert data; and a third apparatus that provides hardware equipment data required for cultivating the biological species, wherein the hardware equipment data are sent and stored in the first database of the service provider, and the data integration module integrates and sends the expert data and the hardware equipment data to the first apparatus, wherein the hardware equipment of the first apparatus creates a third environmental parameter based on the hardware equipment data, wherein the third environmental parameter includes at least one selected from the group consisting of light, temperature, moisture, carbon dioxide, and nutrient concentration, and wherein the hardware equipment comprises at least one selected from the group consisting of a light source, a heater, a cooler, a drier, a humidifier, a carbon dioxide generator, and a nutrient dispenser.

2. The device of claim 1, wherein the first apparatus downloads the operation page through the first processor and builds the request of the first apparatus on the operation page.

3. The device of claim 1, wherein the second apparatus further comprises a biological growth simulation module and a second database, the biological growth simulation module simulates the growth states of the biological species, so as to obtain the third environmental parameter and store the third environmental parameter in the second database.

4. The device of claim 3, wherein the second apparatus further comprises a second monitor that monitors simulation states of the biological growth simulation module, so as to obtain the third environmental parameter and store the third environmental parameter in the second database.

5. The device of claim 1, wherein the service provider monitors in a real-time manner the first environment parameter and the growth states of the biological species through the first monitor and the first processor, and the second transceiver issues a warning message to the first apparatus when abnormality is found.

6. The device of claim 1, wherein the data integration module of the service provider further integrates all kinds of environmental parameters, and stores the environmental parameters in the first database of the service provider.

* * * * *